United States Patent
Kitagawa et al.

(10) Patent No.: US 11,401,092 B2
(45) Date of Patent: Aug. 2, 2022

(54) RESIN-COATED METAL SHEET FOR CONTAINER

(71) Applicant: JFE STEEL CORPORATION, Tokyo (JP)

(72) Inventors: Junichi Kitagawa, Tokyo (JP); Tomonari Hiraguchi, Tokyo (JP); Norihiko Nakamura, Tokyo (JP); Hayato Saito, Tokyo (JP); Yasuhide Oshima, Tokyo (JP); Katsumi Kojima, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 16/615,370

(22) PCT Filed: May 24, 2018

(86) PCT No.: PCT/JP2018/020049
§ 371 (c)(1),
(2) Date: Nov. 20, 2019

(87) PCT Pub. No.: WO2018/221385
PCT Pub. Date: Dec. 6, 2018

(65) Prior Publication Data
US 2020/0172308 A1    Jun. 4, 2020

(30) Foreign Application Priority Data
May 31, 2017   (JP) .............................. JP2017-107359

(51) Int. Cl.
*B65D 65/42* (2006.01)
*B65D 23/02* (2006.01)
(Continued)

(52) U.S. Cl.
CPC .............. *B65D 65/42* (2013.01); *B21D 22/28* (2013.01); *B65D 23/02* (2013.01); *B65D 23/0821* (2013.01)

(58) Field of Classification Search
CPC . B32B 15/09; B32B 2439/66; B32B 2255/06; B32B 2307/538
See application file for complete search history.

(56) References Cited

U.S. PATENT DOCUMENTS 6,783,825 B1 * 8/2004 Ohishi .................... B32B 15/09
                                                      428/35.7
9,751,283 B2 * 9/2017 Yamanaka .............. B32B 15/09
(Continued)

FOREIGN PATENT DOCUMENTS

EP    2 110 236 A1    10/2009
EP    2 752 291 A1    7/2014
(Continued)

OTHER PUBLICATIONS

English Language translation of JP-2005161785-A (Year: 2005).*
(Continued)

*Primary Examiner* — Prashant J Khatri
*Assistant Examiner* — Daniel P Dillon
(74) *Attorney, Agent, or Firm* — Oliff PLC

(57) ABSTRACT

A resin-coated metal sheet for a container, the metal sheet including: a first resin coat layer provided on a first surface of the metal sheet; a second resin coat layer provided on a second surface of the metal sheet, wherein each of the first and the second resin coat layers is composed mainly of a polyester resin having a melting point of 230° C. to 254° C., and the first resin coat layer, in a state that the resin coat layers coat the metal sheet, is formed of a resin material having: an arithmetic average roughness (Ra) of 0.10 μm to 1.0 μm; a crystallization temperature of 110° C. to 160° C.;

(Continued)

and a water contact angle of 55 degrees to 80 degrees in a state that the resin coat layers have been heated at 240° C. for 90 seconds after the resin coat layers coat the metal sheet.

12 Claims, 1 Drawing Sheet

(51) Int. Cl.
    *B65D 23/08*    (2006.01)
    *B21D 22/28*    (2006.01)

(56) References Cited

U.S. PATENT DOCUMENTS

| | | | | |
|---|---|---|---|---|
| 2010/0000632 A1* | 1/2010 | Oshima | ............... | B32B 27/36 148/333 |
| 2010/0025283 A1 | 2/2010 | Oshima et al. | | |
| 2014/0162055 A1* | 6/2014 | Kitagawa | ............... | B32B 27/18 428/336 |
| 2016/0009444 A1* | 1/2016 | Nakagawa | ............... | B32B 1/00 206/524.2 |
| 2018/0050518 A1* | 2/2018 | Nakaya | ............... | B32B 27/36 |
| 2018/0361715 A1* | 12/2018 | Sato | ............... | B32B 27/08 |

FOREIGN PATENT DOCUMENTS

| | | | |
|---|---|---|---|
| EP | 2 962 951 A1 | | 1/2016 |
| JP | H02-303634 A | | 12/1990 |
| JP | H04-091825 A | | 3/1992 |
| JP | H05-331302 A | | 12/1993 |
| JP | H08-169098 A | | 7/1996 |
| JP | 2003-246005 A | | 9/2003 |
| JP | 2004-130536 A | | 4/2004 |
| JP | 2004-148324 A | | 5/2004 |
| JP | 2005161785 A | * | 6/2005 |
| JP | 2006-7746 A | | 1/2006 |
| JP | 2007-045508 A | | 2/2007 |
| JP | 2008-105724 A | | 5/2008 |
| JP | 2008-188905 A | | 8/2008 |
| JP | 2009-184262 A | | 8/2009 |
| WO | WO-2017022526 A1 * | 2/2017 | ............ B32B 27/20 |

OTHER PUBLICATIONS

Jul. 31, 2018 Search Report issued in International Patent Application No. PCT/JP2018/020049.

Apr. 3, 2020 Extended Search Report issued in European Patent Application No. 18808864.5.

* cited by examiner

RESIN-COATED METAL SHEET FOR CONTAINER

FIELD

The present invention relates to a resin-coated metal sheet for a container, in which the metal sheet has resin coat layers on both surfaces thereof.

BACKGROUND

In general, a metal container is roughly classified into a two-piece can and a three-piece can. The two-piece can is a metal container composed of two portions, i.e., a can body that is integrated with a can bottom and a lid body. The three-piece can is a metal container composed of three portions, i.e., a can trunk, an upper lid, and a bottom lid. The can body of the two-piece can has a good appearance because it does not have a seamed portion (welded portion); but it generally requires a high degree of processing. On the other hand, the can trunk of the three-piece can has an inferior appearance as compared with the can body of the two-piece can because it has a seamed portion; but in general, it does not require a high degree of processing. Accordingly, there is a tendency that the two-piece can is used for a metal container with a small volume and a high price, while the three-piece can is used for a metal container with a large volume and a low price.

Among the two-piece cans, especially the two-piece can having a high degree of processing in drawing and a high stretching degree in the height direction of the can, that is, the two-piece can having a high degree of processing, uses a soft metal material such as an expensive and thick aluminum sheet as the metal material of the can body thereof, and there are not so many examples in which an inexpensive and thin steel sheet such as a tin plate or a tin-free steel is used. This is because, it is difficult in the steel sheet to use the shaping process with a high degree of processing such as a draw processing method and a DI (Draw & Ironing) processing method, but in a soft metal material, an impact shaping method with a high degree of processing can be used. Here, examples of the two-piece can with a high degree of processing include an aerosol can and a food can (see Patent Literatures 1 and 2).

On the other hand, with regard to the two-piece can with a low degree of processing, a technology is proposed in which a can body is produced with the draw processing method or the DI processing method using as the material a resin-coated metal sheet for a container; the metal sheet having the resin coat layers on both surfaces thereof (see Patent Literatures 3 to 5). Also, a technology is proposed in which after the shaping process a white pigment is added to the resin coat layer located on the outside of the metal container so as to enable to carry out the process to enhance a design quality of the can body in a printing process or the like (see Patent Literatures 6 and 7).

CITATION LIST

Patent Literature

Patent Literature 1: Japanese Patent Application Laid-open No. 2007-045508
Patent Literature 2: Japanese Patent Application Laid-open No. 2009-184262
Patent Literature 3: Japanese Patent Application Laid-open No. H02-303634
Patent Literature 4: Japanese Patent Application Laid-open No. H04-91825
Patent Literature 5: Japanese Patent Application Laid-open No. 2004-148324
Patent Literature 6: Japanese Patent Application Laid-open No. H08-169098
Patent Literature 7: Japanese Patent Application Laid-open No. 2004-130536

SUMMARY

Technical Problem

In recent years, in view of saving resources and cutting material costs, a material sheet is getting thinner and thinner. In order to obtain a can body having the same shape even using a thinned material, a degree of processing needs to be increased. However, when the degree of processing is increased, the resin coat layer is broken or scraped off, located on the outside of the can body of the resin-coated metal sheet for a container, so that there is a chance that the processing cannot be made. Accordingly, in order to produce the can body of the two-piece can with a high degree of processing by using the resin-coated metal sheet for a container, breakage or scrape-off of the resin coat layer on the outside of the can body due to processing needs to be prevented from occurring. In addition, the resin coat layer on the outside of the can body is printed with various ways in order to enhance the design quality, so that when a lubricant is simply applied onto the resin coat layer on the outside of the can body, the adhesion property thereof with a printing ink is impaired thereby causing strip-off of the printing ink to deteriorate the design quality.

The present invention was made in view of the problems described above; and thus, an object of the present invention is to provide a resin-coated metal sheet for a container in which the resin coat layer on the outside of the can body is not broken or scraped off even when this is processed with a high degree of processing, and in addition, a printing quality thereof is superior.

Solution to Problems

The inventors of the present invention carried out an extensive investigation; and as a result, they found that in order to suppress generation of breakage or scrape-off of the resin coat layer on the outside of the can body, these having been generated by shaping with a high degree of processing, at the time when the metal sheet was coated with the resin coat layer, the breaking strength and the breaking elongation of the resin coat layer needed to be balanced, and at the same time, not only an arithmetic average roughness (Ra) of the resin coat layer on the outside of the can needed to be within a specific range but also a crystallization temperature of the resin coat layer after coating the metal sheet needed to be 110° C. to 160° C. Further, the inventors of the present invention found that in order to suppress the strip-off of a printing ink after printing even if the printing ink having a poor adhesion property is used, a wetting property of the resin coat layer after a heat treatment thereof needed to be controlled highly precisely. Then, the inventors of the present invention carried out further investigation on the basis of these findings, and as a result, they arrived at the technological idea that by controlling the arithmetic average roughness (Ra) of the resin coat layer, processability of the resin coat layer could be enhanced, shaping with a high degree of processing could be achieved, and the printing quality could be enhanced.

To solve the problem and achieve the object, a resin-coated metal sheet for a container according to the present invention includes: the metal sheet including resin coat layers provided on respective surfaces of the metal sheet, wherein each of the resin coat layers is composed mainly of a polyester resin having a melting point of 230° C. to 254° C., and one of the resin coat layers located on outside of the container after a shaping process is formed of a resin material having: an arithmetic average roughness (Ra) of 0.10 μm to 1.0 μm in a state that the resin coat layers coat the metal sheet; a crystallization temperature of 110° C. to 160° C. in the state that the resin coat layers coat the metal sheet; and a water contact angle of 55 degrees to 80 degrees in a state that the resin coat layers have been heated at 240° C. for 90 seconds after the resin coat layers coat the metal sheet.

Moreover, in the resin-coated metal sheet for a container according to the present invention, 100/mm² to 1500/mm² of inorganic particles having an average particle diameter of 0.010 μm to 3.0 μm are present on a surface of the resin coat layer located on the outside of the container after the shaping process.

Moreover, in the resin-coated metal sheet for a container according to the present invention, the resin coat layer located on the outside of the container after the shaping process includes 0.10% by mass or less of a polyethylene wax.

Moreover, in the resin-coated metal sheet for a container according to the present invention, the resin coat layer located on the outside of the container after the shaping process includes 30% by mass or less of titanium oxide.

Moreover, in the resin-coated metal sheet for a container according to the present invention, the resin coat layer located on the outside of the container after the shaping process has a three-layered structure including an outermost surface layer, an intermediate layer, and a lowermost layer, wherein a film thickness of the outermost surface layer and a film thickness of the lowermost layer are 1.0 μm to 5.0 μm, a film thickness of the intermediate layer is 6 μm to 30 μm, the outermost surface layer and the lowermost layer include 0% by mass to 2% by mass of titanium oxide, and the intermediate layer includes 10% by mass to 30% by mass of titanium oxide.

Advantageous Effects of Invention

According to the present invention, what can be provided is a resin-coated metal sheet for a container in which the resin coat layer on the outside of the can body is not broken or scraped off even when this is processed with a high degree of processing, and in addition, a printing quality thereof is superior.

DESCRIPTION OF EMBODIMENTS

Figure 1:
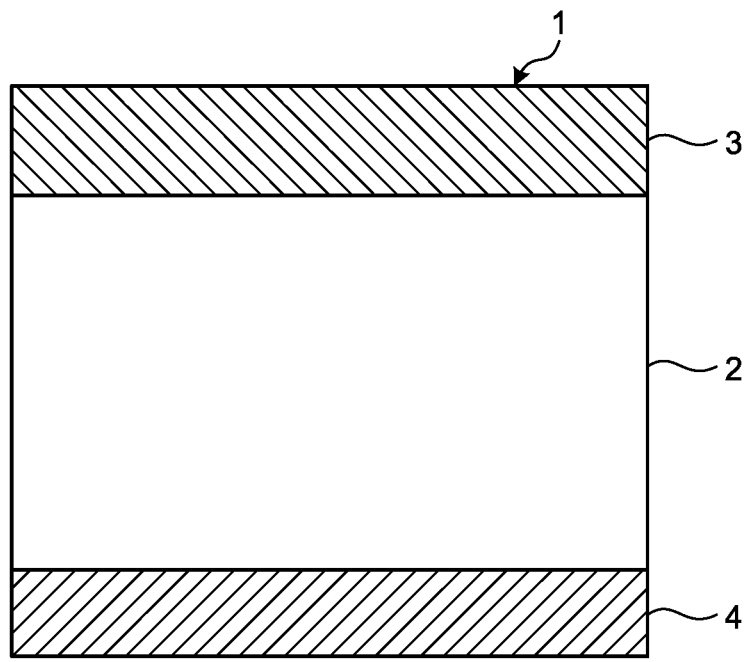
FIG. 1 is a cross sectional view illustrating a composition of the resin-coated metal sheet for a container according to an embodiment of the present invention.

Hereinafter, an embodiment of the resin-coated metal sheet for a container in the present invention will be explained with referring to the drawings. Hereinafter, the term "%" means "% by mass (wt %)" unless otherwise stated.

Figure 2:
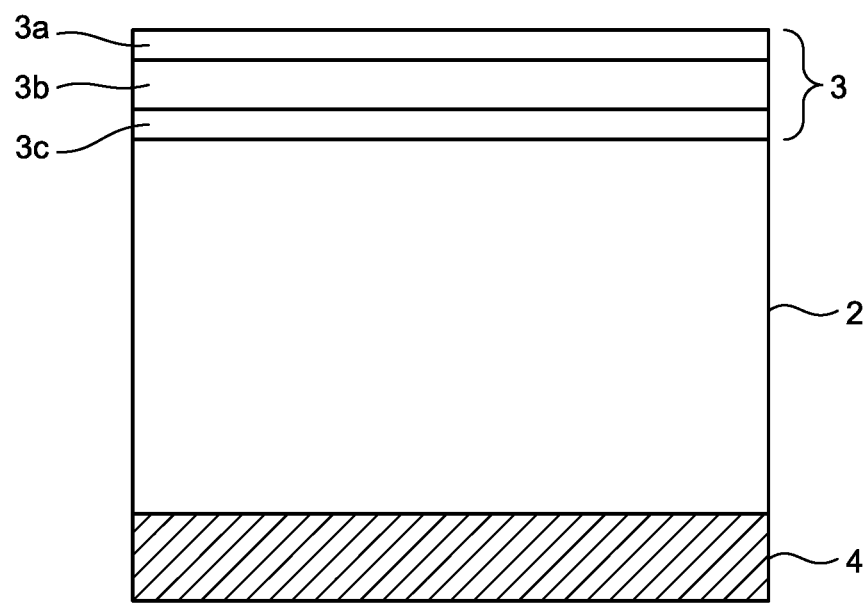
FIG. 2 is a cross sectional view illustrating a composition of a modified example of the resin-coated metal sheet for a container illustrated in FIG. 1.

FIG. 1 is a cross sectional view illustrating a composition of the resin-coated metal sheet for a container according to an embodiment of the present invention. FIG. 2 is a cross sectional view illustrating a composition of a modified example of the resin-coated metal sheet for a container illustrated in FIG. 1. As illustrated in FIG. 1, a resin-coated metal sheet for a container 1 according to an embodiment of the present invention is provided with a metal sheet 2, a resin coat layer 3 formed on a front surface side of the metal sheet 2, and a resin coat layer 4 formed on a back surface side of the metal sheet 2. The resin coat layer 3 and the resin coat layer 4 are located on the outside and the inside, respectively, of the metal container after the shaping process.

The metal sheet 2 is formed of a steel sheet such as a tin plate or a tin-free steel. With regard to the tin plate, those having the plating amount of 0.5 g/m² to 15 g/m² may be used. With regard to the tin-free steel, those having on the surface thereof a metal chromium layer with the attached amount of 50 mg/m² to 200 mg/m² and a chromium oxide layer with the attached amount of 3 mg/m² to 30 mg/m² (in terms of the metal chromium layer) may be used. Although the type of steel sheet is not particularly restricted so far as it can be shaped to an intended shape, metal sheets having following compositions and obtained by following production methods are preferable.

(1) Those obtained by recrystallization-annealing with box annealing of a low carbon steel with the carbon content of about 0.010% to about 0.10%.

(2) Those obtained by recrystallization-annealing with continuous annealing of a low carbon steel with the carbon content of about 0.010% to about 0.10%.

(3) Those obtained by recrystallization-annealing with continuous annealing and overage treatment of a low carbon steel with the carbon content of about 0.010% to about 0.10%.

(4) Those obtained by recrystallization-annealing with box annealing or continuous annealing of a low carbon steel with the carbon content of about 0.010% to about 0.10% followed by double reduced (DR) rolling.

(5) Those obtained by recrystallization-annealing with continuous annealing of an interstitial free (IF) steel in which an element immobilizing the solid-soluted carbon such as Nb or Ti to is added to a very low-carbon steel with the carbon content of about 0.003% or less.

Although mechanical characteristics of the steel sheet is not particularly restricted so far as it can be shaped to an intended shape, in order to retain a can body strength sufficiently well without impairing processability, the steel sheet having a yielding stress (YP) of about 220 MPa to about 580 MPa is preferably used. In addition, a Lankford value (r-value), which is an indicator of plastic anisotropy, is preferably 0.8 or more; and an absolute value of the in-plane anisotropy (Δr) of the r-value is preferably 0.7 or less. Thickness of the steel sheet may be appropriately determined from the can's shape and the necessary strength of the can body in accordance with the object thereof. In view of suppressing the increase in the costs of the steel sheet itself and of the can body, the steel sheet having the thickness of about 0.15 mm to about 0.4 mm is preferably used.

Components of the steel to achieve the above-mentioned characteristics are not particularly restricted so far as the steel includes components such as, for example, Si, Mn, P, S, Al, and N. The preferable contents of these components are: 0.001% to 0.1% for Si; 0.01% to 0.6% for Mn; 0.002% to 0.05% for P; 0.002% to 0.05% for S; 0.005% to 0.100% for Al; and 0.0005% to 0.020% for N. Other components such as B, Cu, Ni, Cr, Mo, and V may also be included therein; in this case, in view of ensuring a corrosion resistance and the like, total content of these other components is preferably 0.02% or less.

The resin coat layers 3 and 4 are formed of mainly a polyester resin having a melting point of 230° C. to 254° C. The melting point of the polyester resin is preferably 234° C. to 252° C., while more preferably 238° C. to 250° C. The polyester resin having the melting point of lower than 230° C. is not preferable, because the heat resistance thereof is so poor that the resin is softened by the heat during the time of a continuous shaping process thereby generating breakage or scrape-off of the resin coat layers 3 and 4. On the other hand, the polyester resin having the melting point of higher than 254° C. is not preferable either, because the crystallinity of the polyester resin is so high that the shaping property thereof is impaired when the degree of processing is high.

Other dicarboxylic acid components or glycol components may be copolymerized in the resin material so far as they do not impair the heat resistance and the processability thereof. Illustrative examples of the dicarboxylic acid component include aromatic dicarboxylic acids such as isophthalic acid, naphthalene dicarboxylic acid, diphenyl dicarboxylic acid, diphenylsulfone dicarboxylic acid, diphenoxyethane dicarboxylic acid, 5-sodium sulfoisophthalate, and phthalic acid; aliphatic dicarboxylic acids such as oxalic acid, succinic acid, adipic acid, sebacic acid, dimer acid, maleic acid, and fumaric acid; alicyclic dicarboxylic acids such as cyclohexane dicarboxylic acid; and oxycarboxylic acids such as p-oxybenzoic acid. Illustrative examples of the glycol component include aliphatic glycols such as propane diol, butane diol, pentane diol, hexane diol, and neopentyl glycol; alicyclic glycols such as cyclohexane dimethanol; aromatic glycols such as bisphenol A and bisphenol S; and diethylene glycol. These dicarboxylic acid components and glycol components may be used as a combination of two or more of them.

The resin material to form the resin coat layers 3 and 4 is not restricted by the production method thereof. The resin material may be formed, for example, by the methods in which (1) terephthalic acid, ethylene glycol, and copolymerizable components are caused to undergo an esterification reaction followed by polycondensation of the reaction product thus obtained to give a copolymerized polyester, or (2) dimethyl terephthalate, ethylene glycol, and copolymerizable components are caused to undergo an ester-exchange reaction followed by polycondensation of the reaction product thus obtained to give a copolymerized polyester. In production of the copolymerized polyester, an additive such as a fluorescent whitening agent, an antioxidant, a heat stabilizer, a UV absorber, or an antistatic agent may be added as needed. When enhancement of whiteness is intended, addition of the fluorescent whitening agent is effective.

The arithmetic average roughness (Ra) of the resin coat layer 3 after coating the metal sheet 2 is 0.10 μm to 1.0 μm. When the surface roughness of the resin coat layer 3 is controlled within this range, a contact area between the surface of the resin coat layer 3 and a mold at the time of shaping can be reduced, and a lubricant supplied to the surface of the resin coat layer 3 at the time of shaping can be readily held therein, so that generation of the breakage or the scrape-off of the resin coat layer 3 caused at the time of shaping with a high degree of processing can be suppressed. The arithmetic average roughness (Ra) of less than 0.10 μm is not preferable because not only the contact area between the surface of the resin coat layer 3 and the mold increases but also the lubricant is not sufficiently held at the time of shaping, these leading to generation of the scrape-off. The arithmetic average roughness (Ra) of more than 1.0 is not preferable either because the rate of the contact between the surface of the resin coat layer 3 and the mold locally increases, thereby rather leading to generation of the scrape-off.

In addition, the crystallization temperature of the resin coat layer 3 after coating the metal sheet 2 needs to be 110° C. to 160° C., while preferably 120° C. to 150° C. The crystallization temperature of the resin coat layer 3 lower than 110° C. is not preferable because crystallization of the resin coat layer 3 is facilitated due to the heat generated during the time of the shaping process thereby impairing the shaping property thereof. On the other hand, the crystallization temperature of higher than 160° C. is not preferable either because crystallinity of the resin coat layer 3 is deteriorated so that a barrier property of the resin coat layer 3 is decreased thereby occasionally causing corrosion when it is made to a final product.

In addition, in order to ensure the adhesion property with various printing inks, the water contact angle of the resin coat layer 3 needs to be 55 degrees to 80 degrees. The water contact angle of less than 55 degrees is not preferable because hydrophilicity of the resin coat layer 3 is so large that the adhesion property thereof decreases when the printing ink includes a large amount of a hydrophobic component. On the other hand, the water contact angle of more than 80 degrees is not preferable either because the adhesion property thereof with the printing ink including a large amount of a hydrophilic group decreases. Here, in many cases, usually the resin coat layer 3 is printed after having been processed, so that the water contact angle is assessed after the resin coat layer 3 is further heated at 240° C. for 90 seconds after coating the metal sheet.

The resin coat layer 3 is preferably formed of a resin material whose ratio of a heat of melting ($\Delta Hm$) to a heat of crystallization ($\Delta Hc$) after coating the metal sheet 2, i.e., $\Delta Hc/\Delta Hm$, is 0.70 to 0.96. When the ratio $\Delta Hc/\Delta Hm$ is less than 0.70, a large amount of crystalline component remains in the resin coat layer 3 after coating the metal sheet 2, so that when shaping with a high degree of processing is carried out, the shaping property thereof is impaired because elongation of the resin coat layer 3 is insufficient. On the other hand, the ratio $\Delta Hc/\Delta Hm$ of more than 0.96 is not preferable either because the crystallinity of the resin coat layer 3 is so low that the mechanical strength of the resin coat layer 3 is decreased, and thus, the impact resistance of the product thereof is deteriorated.

In addition, in the resin coat layer 3, as the means to control the surface roughness, it is preferable for inorganic particles having the average particle diameter of 0.010 μm to 3.0 μm to be present on the surface of the resin coat layer 3 such that the number of these particles may be 100/mm$^2$ to 1500/mm$^2$ therein. When the number of the inorganic particles is less than 100/mm$^2$, it is difficult to ensure the arithmetic average roughness (Ra) of the resin coat layer 3 to be 0.10 μm or more. On the other hand, the number of the inorganic particles of more than 1500/mm$^2$ is not preferable either because the arithmetic average roughness (Ra) occasionally becomes more than 1.0 μm. The number of the inorganic particles per unit area is more preferably 200/mm$^2$ to 1200/mm$^2$, while still more preferably 400/mm$^2$ to 1000/mm$^2$.

Here, the inorganic particles may be blended as appropriately such that the inorganic particles having the particle diameter within the above-mentioned range may be in the above-mentioned distribution in terms of the number on the outermost surface of the resin coat layer 3. As a guide, the blending amount thereof is preferably 0.005% to 1.0% relative to the mass of the outermost surface layer of the resin coat layer 3. When the addition amount of the inorganic particles is less than 0.005%, it is difficult to ensure the presence of the inorganic particles to be 100/mm² or more in the outermost surface of the resin coat layer 3. On the other hand, when the addition amount thereof is more than 1.0%, it is difficult to control the inorganic particles to be 1500/mm² or less in the surface of the resin coat layer 3. The addition amount of the inorganic particles is more preferably 0.010% to 0.8%, while still more preferably 0.020% to 0.5%, relative to the mass of the outermost surface layer of the resin coat layer 3.

Although there is no particular restriction in the inorganic particle, silica, alumina, kaolin, talc, graphite, titanium dioxide, calcium carbonate, and barium sulfate are preferable. Although the shape of the inorganic particle is not particularly restricted, with the inorganic particle having a true sphere shape, the surface roughness can be controlled more readily. In the experiments of the present invention, silica and alumina having a true sphere shape were used. The average particle diameter thereof is preferably 0.010 μm to 3.0 μm, while more preferably 0.05 μm to 2.5 μm. The average particle diameter of less than 0.010 μm is not preferable because in order to ensure the arithmetic average roughness of the resin coat layer 3, the addition amount thereof needs to be increased, which causes deterioration of the mechanical strength of the resin coat layer 3. On the other hand, the average particle diameter of more than 3.0 μm is not preferable either because this causes formation of a pinhole of the resin coat layer 3 and the scrape-off during the shaping, as well as deterioration of the barrier property of the product.

In order to enhance the shaping property, it is preferable that the resin coat layer 3 includes a wax in the range of 0.10% or less. In order to obtain an improving effect of sliding property, the addition amount of the wax is preferably 0.010% or more. On the other hand, the addition amount of more than 0.10% is not preferable because when the resin-coated metal sheet for a container is heated, the water contact angle is increased thereby causing a decrease in the adhesion property with a printing ink such as the one including a large amount of a hydrophilic component. Although there is no particular restriction in the kind of the wax, a polyethylene wax is preferable in view of easy handling. Because exposure of the wax onto the film surface is facilitated during the can making process thereby enhancing the lubrication property of the film surface, the dropping point of the wax is preferably 120° C. to 140° C., while more preferably 130° C. to 140° C. In the present invention, the polyethylene wax having the dropping point of 135° C. was used (the dropping point was measured in accordance with DIN 51801/2 using the Ubbelohde dropping point measurement instrument).

The resin-coated metal sheet for a container can be suitably produced by the way as follows. Namely, the metal sheet 2 is heated to or above the melting point of the resin coat layers 3 and 4, and then, the temperature of the metal sheet 2 immediately after it is coated with the resin coat layers 3 and 4 by means of a laminating roll is retained in the range from crystallization temperature of the resin coat layers 3 and 4 to +40° C. of the crystallization temperature thereof. At the time of coating with the resin coat layers 3 and 4, the surface pressure thereof needs to be 19.6 N to 196 N (2.0 kgf/cm² to 20 kgf/cm²). When the surface pressure is below this range, melting of the resin coat layers 3 and 4 is insufficient because even if the temperature of the interface between the metal sheet 2 and the resin coat layers 3 and 4 is equal to or higher than the melting point thereof, the time when the temperature is equal to or higher than the melting point is too short that there is a case that sufficient adhesion property between the metal sheet 2 and the resin coat layers 3 and 4 cannot be obtained. On the other hand, when the surface pressure is higher than this range, occasionally the resin coat layers 3 and 4 adhere to each other by melting. The coating time of the resin coat layers 3 and 4 by means of a laminating roll with pressing is preferably 2 msec to 30 msec. When the coating time is less than 2 msec, the compression adhesion of the resin coat layers 3 and 4 to the metal sheet 2 is insufficient thereby occasionally causing deterioration of the adhesion property. On the other hand, when the coating time is more than 30 msec, the cooling effect by the laminating roll is so large that melting of the resin coat layers 3 and 4 is insufficient thereby occasionally causing deterioration of the adhesion property and the processability.

The temperature of the laminating roll is preferably −20° C. of the glass transition temperature of the resin coat layers 3 and 4 to +50° C. of the glass transition temperature of the resin coat layers 3 and 4. When the temperature of the laminating roll is lower than −20° C. of the glass transition temperature of the resin coat layers 3 and 4, crystallinity on the surface side of the resin coat layers 3 and 4 becomes so high that the shaping property is occasionally deteriorated. On the other hand, when the temperature of the laminating roll is higher than +50° C. of the glass transition temperature of the resin coat layers 3 and 4, the lubricant component present on the surface of the resin coat layers 3 and 4 is transferred to the surface of the laminating roll thereby occasionally causing a problem such as poor appearance of the resin-coated metal sheet for a container after lamination.

The crystallization temperature of the polyester resin of the resin coat layer 3 is 110° C. to 160° C. In order to control the crystallization temperature within this range, it is preferable to cool the resin-coated metal sheet for a container with water within 0.5 seconds to 3 seconds after coating by means of the laminating roll. When the time until the resin-coated metal sheet for a container is cooled with water is shorter than 0.5 seconds, the resin coat layer 3 heated at a high temperature is rapidly cooled, thereby occasionally causing deterioration of the surface form of the resin coat layer 3. On the other hand, the time longer than 3 seconds until it is cooled with water is not preferable, because crystallization due to natural cooling progresses during the time until the resin coat layer 3 is cooled with water after coating so that the crystallization temperature becomes lower than 110° C. thereby occasionally causing deterioration of the processability. The water temperature upon cooling with water is preferably 20° C. to 85° C. As mentioned above, the crystallization temperature of the polyester resin of the resin coat layer 3 can be controlled by changing the melting point and crystallization temperature of the resin coat layer 3 before coating, the coating conditions (heating temperature of the metal sheet, temperature of the laminating roll, nip pressure, time until water-cooling after coating, cooling temperature after coating, and line velocity), and the kind of the resin.

The water contact angle of the resin coat layer 3 after coating the metal sheet 2 followed by further heating at 240° C. for 90 seconds is 55 degrees to 80 degrees.

The melting point of the resin coat layer 3 (TmB) is to be 230° C. to 254° C., while preferably 240° C. to 250° C. When the melting point of the resin coat layer 3 is lower than 230° C., softening of the resin coat layer 3 is facilitated due to surface sliding upon processing, heat generation upon processing the metal sheet 2, and the like, thereby occasionally generating breakage or scrape-off of the surface of the resin coat layer 3. On the other hand, when the melting point of the resin coat layer 3 is higher than 254° C., crystallinity of the resin coat layer 3 is increased so that there is a chance that processing with a high degree of processing cannot follow.

The melting point of the resin coat layer 4 (TmA) is to be 230° C. to 254° C., preferably 234° C. to 246° C., while more preferably 238° C. to 244° C. The melting point of the resin coat layer 4 lower than 230° C. is not preferable because adsorption or the like of the contents readily take place. On the other hand, when the melting point of the resin coat layer 4 is higher than 254° C., crystallinity of the resin coat layer 4 is increased so that there is a chance that processing with a high degree of processing cannot follow.

The intrinsic viscosity (IV) of the resin coat layers 3 and 4 is 0.50 dL/g to 0.90 dL/g, preferably 0.52 dL/g to 0.80 dL/g, while more preferably 0.55 dL/g to 0.75 dL/g. The intrinsic viscosity of the resin coat layers 3 and 4 less than 0.50 dL/g is not preferable because molecular weight of the resin coat layers 3 and 4 is so low that the mechanical strength of the resin coat layers 3 and 4 decreases. On the other hand, the intrinsic viscosity of the resin coat layers 3 and 4 more than 0.90 dL/g is not preferable either because the film forming property is occasionally deteriorated. Here, the intrinsic viscosity (IV) of the resin coat layers 3 and 4 can be adjusted, among others, by controlling polymerization conditions (amount of polymerization catalyst, polymerization temperature, polymerization time, etc.), and by further carrying out solid phase polymerization under vacuum or an inert atmosphere such as nitrogen after melt polymerization.

The resin coat layer 3 is occasionally required to be white in order to enhance the design quality during the printing process. In this case, the resin coat layer 3 is made to include titanium oxide of 8% to 30%, preferably 10% to 25%, while more preferably 12% to 20%, relative to total weight of the resin coat layer 3. When the content of the titanium oxide is less than 8% or less, whiteness cannot be sufficiently ensured after processing. On the other hand, when the content of the titanium oxide is more than 30%, there are problems in the adhesion property between the metal sheet 2 and the resin coat layer 3 and in the processability when the shaping process with a high degree of processing is carried out.

Although the titanium oxide to be added to the resin coat layer 3 is not particularly restricted, it is preferable to use a rutile type titanium oxide having the purity of 90% or more. When the purity of the rutile type titanium oxide is less than 90%, not only dispersibility of the titanium oxide upon mixing with the resin material is not so good, but also the molecular weight of the resin material is occasionally decreased. The titanium oxide may be added with various methods such as following (1) to (3). When the titanium oxide is added with the method (1), it is preferable that the titanium oxide is added to the reaction system as the slurry of the titanium oxide dispersed in glycol. In order to ensure whiteness after processing, the thickness of the resin coat layer 3 added with the titanium oxide is 10 μm to 40 μm, preferably 12 μm to 35 μm, while more preferably 15 μm to 25 μm. When the thickness of the resin coat layer 3 is less than 10 μm, cracking of the resin coat layer 3 at the time of processing is facilitated. On the other hand, the thickness of the resin coat layer 3 which is more than 40 μm is of over quality and uneconomical.

(1) The method in which titanium oxide is added before termination of the ester-exchange reaction or the esterification reaction at the time of synthesis of the copolymer polyester, or before initiation of the polycondensation reaction.

(2) The method in which titanium oxide is added to the copolymer polyester followed by melt-kneading the resulting mixture.

(3) In the methods (1) and (2), master pellets added with a large amount of titanium oxide are produced, and then, the pellets are kneaded with the copolymer polyester not including the particles so as to include a prescribed amount of titanium oxide.

The resin coat layer 3 may be a multilayered structure having different functions in each layer, such as a two-layer structure of an upper layer and a lower layer, or a structure of at least three layers formed of an outermost surface layer (upper layer) 3a, an intermediate layer (main layer) 3b, and a lowermost layer (lower layer) 3c, as illustrated in FIG. 2. Illustrative examples of the way how to construct the multilayer structure having a function in each layer include: to include the inorganic particles into the outermost surface layer thereby efficiently controlling the number of the inorganic particles in the outermost surface; to include a wax in the outermost surface and/or the lowermost surface so as to reduce the amount of the wax as a total in the resin coat layer so as to effectively control the processability; and to add a greater amount of the pigment to the intermediate layer of the multilayer structure thereby controlling the color tone in the total layers while ensuring the processability and so forth. In this case, the film thickness of the outermost surface layer 3a and of the lowermost layer 3c are 1.0 μm to 5.0 μm, preferably 1.5 μm to 4.0 μm, while more preferably 2.0 μm to 3.0 μm; and the film thickness of the intermediate layer 3b is 6 μm to 30 μm, preferably 8 μm to 25 μm, while more preferably 10 μm to 20 μm. In order to compatibly satisfy the whiteness and the processability as the layer, it is preferable that the outermost surface layer 3a and the lowermost layer 3c include 0% to 2% of titanium oxide, and the intermediate layer 3b includes 10% to 30% of titanium oxide.

Especially when titanium oxide is added to the outermost surface layer 3a, the adhesion property thereof with the printing ink can be enhanced so that the printing quality can be improved. In view of the printing quality, the amount of titanium oxide in the outermost surface layer 3a is preferably 0.5% or more. On the other hand, when the amount of titanium oxide in the outermost surface layer 3a is more than 2%, breakage or scrape-off of the resin coat layer 3 is occasionally generated at the time of processing, so that it is preferable that the amount of titanium oxide in the outermost surface layer 3a is made to 2% or less.

As described before, even if it is intended to give the functions to each layer of the three-layer structure, when the film thickness of the outermost surface layer 3a and/or the lowermost layer 3c is less than 1.0 1.1m, expression of the function therein is insufficient, thereby occasionally generating the breakage or scrape-off of the resin coat layer 3, or failing to sufficiently ensure the gloss of the surface of the resin coat layer 3. On the other hand, when it is intended to give the functions to the outermost surface layer 3a and/or the lowermost layer 3c as mentioned above, the thickness of 5 μm or less is sufficient. In order to ensure the whiteness, for example when the need emerges to increase the film thickness of the intermediate layer 3b including titanium oxide or to increase the amount of titanium oxide therein, the film thickness of the outermost surface layer 3a and/or the lowermost layer 3c in the range of more than 5 μm is rather unpreferable in view of economy and processability.

EXAMPLES

By using TFS (tin free steel: metal Cr layer; 120 mg/m², Cr oxide layer; 10 mg/m² in terms of metal Cr) with T3CA and thickness of 0.22 mm as the metal sheet, both surfaces of the metal sheet were coated with the resin coat layers of Examples 1 to 22 and Comparative Examples 1 to 10 listed in Tables 1-1 to 1-4 below by means of the film lamination method (film thermocompression adhesion method). Specifically, under the lamination conditions described in Table 1-4, the metal sheet was heated and then adhered with the resin coat layers in the form of film, which had been obtained by a biaxial stretching method, by the thermocompression adhesion method by means of a laminating roll. The temperature at the time of lamination was measured with a radiation thermometer (at the position 100 mm from a nip position). The metal sheet was cooled with water after 1.5 seconds from the thermocompression adhesion to obtain an intended sample of the metal sheet having the resin coat layers coated on both surfaces thereof. The melting point, the crystallization temperature, the whiteness, the water contact angle, and the number of the particles of the inorganic particles of the resin coat layer in the resin-coated metal sheet for a container thus obtained were measured with the methods described below.

(1) Measurements of the melting point and the crystallization temperature of the resin coat layer By using a differential scanning calorimeter, the resin coat layer before coating was heated from a room temperature to 290° C. with the temperature raising rate of 10° C/min to measure the endothermic peak thereof, and thereby the peak temperature of the endothermic peak measured in the temperature range of 200° C. to 280° C. was taken as the melting point of the resin coat layer. The resin coat layer coated on the metal sheet was peeled off from the metal sheet, and this peeled-off resin coat layer was heated from a room temperature to 290° C. with the temperature raising rate of 10° C/min to measure the exothermic peak thereof, and thereby the peak temperature of the exothermic peak measured in the temperature range of 80° C. to 200° C. was taken as the crystallization temperature of the resin coat layer.

(2) Whiteness

The whiteness of the resin coat layer of the resin-coated metal sheet for a container was assessed with the method described in JIS Z 8722 using a spectrocolorimeter. The L value of the Hunter Lab value, measured with the measurement area of 8 mm(1), the measurement light source of the C condition, and the observation condition of a 2-degree view field to the measurement light source, was taken as the whiteness.

(3) Water contact angle

The resin-coated metal sheet for a container was heat-treated in a hot air drying oven so as to reach 240° C. in 90 seconds, and then, it was cooled to a room temperature. Thereafter, the water contact angle of the resin coat layer located on the outside of the container was assessed at 25° C.

(4) Number of the particles of the inorganic particles

In order to impart conductivity to the resin-coated surface (resin coat layer 3) on the outside of the container of the resin-coated metal sheet for a container, carbon was vapor-deposited thereon. The reflected electron image of the surface of the resin coat layer 3 after vapor-deposition of the carbon was observed in 10 view fields by using a field emission-type scanning electron microscope (FE-SEM) with the acceleration voltage of 5.0 kV and the magnification of 500 times to obtain an average value of the number of the particles of the inorganic particles per unit area.

(5) Arithmetic average roughness (Ra)

The arithmetic average roughness (Ra) of the resin-coated surface (resin coat layer 3) on the outside of the container of the resin-coated metal sheet for a container was measured by using a laser microscope (VK-X100; manufactured by Keyence Corp.). The surface roughness was measured at 5 positions in the steel sheet rolling direction and 5 positions in the steel sheet width direction in the measurement view field of 270 μm (steel sheet rolling direction)×200 μm (steel sheet width direction) with the magnification of 1000 times in the laser microscope; and then, the average value thereof was obtained. The average value was obtained with the condition in accordance with JIS B 0601 using the software attached to the laser microscope instrument.

TABLE 1-1

| | Outer surface resin layer Outermost surface layer | | | | | | |
|---|---|---|---|---|---|---|---|
| | Composition [mol %] | TiO₂ amount [Wt %] | Layer thickness [μm] | Inorganic particle | Inorganic particle average diameter [μm] | Inorganic particle addition amount wt % | Number of inorganic particles on surface [number/mm²] | Addition amount of polyethylene wax [wt %] |
| Example 1 | — | — | — | — | — | — | — | — |
| Example 2 | — | — | — | — | — | — | — | — |
| Example 3 | — | — | — | — | — | — | — | — |
| Example 4 | — | — | — | — | — | — | — | — |
| Example 5 | — | — | — | — | — | — | — | — |
| Example 6 | — | — | — | — | — | — | — | — |
| Example 7 | — | — | — | — | — | — | — | — |
| Example 8 | — | — | — | — | — | — | — | — |
| Example 9 | — | — | — | — | — | — | — | — |
| Example 10 | Ethylene terephthalate 96 Ethylene isophthalate 4 | 0 | 2.0 | Silica | 1.8 | 0.10 | 400 | 0.01 |
| Example 11 | Ethylene terephthalate 96 Ethylene isophthalate 4 | 0 | 2.0 | Silica | 2.0 | 0.10 | 400 | 0.10 |

TABLE 1-1-continued

| | Outer surface resin layer Outermost surface layer | | | | | | | |
|---|---|---|---|---|---|---|---|---|
| | Composition [mol %] | TiO$_2$ amount [Wt %] | Layer thickness [μm] | Inorganic particle | Inorganic particle average diameter [μm] | Inorganic particle addition amount wt % | Number of inorganic particles on surface [number/mm$^2$] | Addition amount of polyethylene wax [wt %] |
| Example 12 | Ethylene terephthalate 96 Ethylene isophthalate 4 | 0 | 1.0 | Silica | 0.8 | 0.20 | 600 | — |
| Example 13 | Ethylene terephthalate 96 Ethylene isophthalate 4 | 0 | 5.0 | Silica | 2.0 | 0.10 | 400 | — |
| Example 14 | Ethylene terephthalate 96 Ethylene isophthalate 4 | 2 | 2.0 | Silica | 1.8 | 0.10 | 800 | — |
| Example 15 | Ethylene terephthalate 96 Ethylene isophthalate 4 | 2 | 2.0 | Silica | 1.8 | 0.10 | 400 | — |
| Example 16 | Ethylene terephthalate 96 Ethylene isophthalate 4 | 2 | 2.0 | Silica | 1.8 | 0.10 | 400 | — |
| Example 17 | Ethylene terephthalate 96 Ethylene isophthalate 4 | 2 | 5.0 | Silica | 1.8 | 0.20 | 600 | — |
| Comp. Example 1 | — | — | — | — | — | — | — | — |
| Comp. Example 2 | — | — | — | — | — | — | — | — |
| Comp. Example 3 | — | — | — | — | — | — | — | — |
| Comp. Example 4 | — | — | — | — | — | — | — | — |
| Comp. Example 5 | — | — | — | — | — | — | — | — |
| Comp. Example 6 | — | — | — | — | — | — | — | — |
| Comp. Example 7 | — | — | — | — | — | — | — | — |
| Comp. Example 8 | — | — | — | — | — | — | — | — |
| Comp. Example 9 | — | — | — | — | — | — | — | — |
| Comp. Example 10 | — | — | — | — | — | — | — | — |
| Example 18 | Ethylene terephthalate 96 Ethylene isophthalate 4 | 0 | 2.0 | Silica | 0.010 | 0.40 | 600 | — |
| Example 19 | Ethylene terephthalate 96 Ethylene isophthalate 4 | 0 | 5.0 | Silica | 3.0 | 0.02 | 200 | — |
| Example 20 | Ethylene terephthalate 96 Ethylene isophthalate 4 | 0 | 2.0 | Alumina | 1.8 | 0.10 | 400 | — |
| Example 21 | Ethylene terephthalate 96 Ethylene isophthalate 4 | 0 | 2.0 | Calcium carbonate | 1.8 | 0.10 | 400 | — |
| Example 22 | Ethylene terephthalate 96 Ethylene isophthalate 4 | 0 | 2.0 | Talc | 1.8 | 0.10 | 400 | — |

TABLE 1-2

Outer surface resin layer
Intermediate layer (main layer) (when there is no description of the outermost surface layer in the table to the left and the lowermost layer in the table to the right, this layer is the outermost surface layer and the lowermost layer)

| | Composition [mol %] | TiO$_2$ amount [Wt %] | Layer thickness [μm] | Inorganic particle | Inorganic particle average diameter [μm] | Inorganic particle addition amount wt % | Number of inorganic particles on surface [number/mm$^2$] | Addition amount of polyethylene wax [wt %] |
|---|---|---|---|---|---|---|---|---|
| Example 1 | Ethylene terephthalate 98 Ethylene isophthalate 2 | 0 | 20 | Silica | 1.8 | 0.10 | 400 | — |
| Example 2 | Ethylene terephthalate 89 Ethylene isophthalate 11 | 0 | 20 | Silica | 1.8 | 0.10 | 400 | — |
| Example 3 | Ethylene terephthalate 96 Ethylene isophthalate 4 | 0 | 20 | Silica | 1.8 | 0.01 | 150 | — |
| Example 4 | Ethylene terephthalate 96 Ethylene isophthalate 4 | 0 | 20 | Silica | 1.8 | 1.00 | 1500 | — |
| Example 5 | Ethylene terephthalate 89 Ethylene isophthalate 11 | 0 | 20 | Silica | 1.8 | 0.10 | 400 | — |
| Example 6 | Ethylene terephthalate 98 Ethylene isophthalate 2 | 0 | 20 | Silica | 1.8 | 0.10 | 400 | — |

TABLE 1-2-continued

Outer surface resin layer
Intermediate layer (main layer) (when there is no description of the outermost surface layer in the table to the left
and the lowermost layer in the table to the right, this layer is the outermost surface layer and the lowermost layer)

| | Composition [mol %] | TiO$_2$ amount [Wt %] | Layer thickness [μm] | Inorganic particle | Inorganic particle average diameter [μm] | Inorganic particle addition amount wt % | Number of inorganic particles on surface [number/mm$^2$] | Addition amount of polyethylene wax [wt %] |
|---|---|---|---|---|---|---|---|---|
| Example 7 | Ethylene terephthalate 98 Ethylene isophthalate 2 | 0 | 20 | Silica | 1.8 | 0.90 | 1400 | — |
| Example 8 | Ethylene terephthalate 96 Ethylene isophthalate 4 | 0 | 20 | Silica | 1.8 | 0.01 | 150 | 0.05 |
| Example 9 | Ethylene terephthalate 96 Ethylene isophthalate 4 | 30 | 20 | Silica | 1.8 | 0.10 | 400 | — |
| Example 10 | Ethylene terephthalate 96 Ethylene isophthalate 4 | 20 | 18 | — | — | — | — | — |
| Example 11 | Ethylene terephthalate 96 Ethylene isophthalate 4 | 20 | 18 | — | — | — | — | — |
| Example 12 | Ethylene terephthalate 96 Ethylene isophthalate 4 | 20 | 16 | — | — | — | — | — |
| Example 13 | Ethylene terephthalate 96 Ethylene isophthalate 4 | 20 | 16 | — | — | — | — | — |
| Example 14 | Ethylene terephthalate 96 Ethylene isophthalate 4 | 20 | 16 | — | — | — | — | — |
| Example 15 | Ethylene terephthalate 96 Ethylene isophthalate 4 | 30 | 7 | — | — | — | — | — |
| Example 16 | Ethylene terephthalate 96 Ethylene isophthalate 4 | 20 | 35 | — | — | — | — | — |
| Example 17 | Ethylene terephthalate 96 Ethylene isophthalate 4 | 10 | 35 | — | — | — | — | — |
| Comp. Example 1 | Ethylene terephthalate 100 | 0 | 20 | Silica | 1.8 | 0.10 | 400 | — |
| Comp. Example 2 | Ethylene terephthalate 88 Ethylene isophthalate 12 | 0 | 20 | Silica | 1.8 | 0.10 | 400 | — |
| Comp. Example 3 | Ethylene terephthalate 89 Ethylene isophthalate 11 | 0 | 20 | Silica | 1.8 | 0.10 | 400 | — |
| Comp. Example 4 | Ethylene terephthalate 70 Butylene terephthalate 30 | 0 | 20 | Silica | 1.8 | 0.10 | 400 | — |
| Comp. Example 5 | Ethylene terephthalate 96 Ethylene isophthalate 4 | 0 | 20 | Silica | 1.8 | 3.30 | 1600 | — |
| Comp. Example 6 | Ethylene terephthalate 96 Ethylene isophthalate 4 | 0 | 20 | Silica | 1.8 | 0.10 | 400 | 0.20 |
| Comp. Example 7 | Ethylene terephthalate 96 Ethylene isophthalate 4 | 0 | 20 | Silica | 0.5 | 0.004 | 130 | — |
| Comp. Example 8 | Ethylene terephthalate 96 Ethylene isophthalate 4 | 35 | 20 | Silica | 1.8 | 0.10 | 400 | — |
| Comp. Example 9 | Ethylene terephthalate 96 Ethylene isophthalate 4 | 0 | 20 | Silica | 3.5 | 0.10 | 400 | — |
| Comp. Example 10 | Ethylene terephthalate 96 Ethylene isophthalate 4 | 0 | 20 | Silica | 0.005 | 0.10 | 350 | — |
| Example 18 | Ethylene terephthalate 96 Ethylene isophthalate 4 | 20 | 16 | — | — | — | — | — |
| Example 19 | Ethylene terephthalate 96 Ethylene isophthalate 4 | 20 | 10 | — | — | — | — | — |
| Example 20 | Ethylene terephthalate 96 Ethylene isophthalate 4 | 20 | 16 | — | — | — | — | — |
| Example 21 | Ethylene terephthalate 96 Ethylene isophthalate 4 | 20 | 16 | — | — | — | — | — |
| Example 22 | Ethylene terephthalate 96 Ethylene isophthalate 4 | 20 | 16 | — | — | — | — | — |

TABLE 1-3

Outer surface resin layer
Lowermost layer

| | Composition [mol %] | TiO$_2$ amount [Wt %] | Layer thickness [μm] | Inorganic particle | Inorganic particle average diameter [μm] | Inorganic particle addition amount wt % | Addition amount of polyethylene wax [wt %] |
|---|---|---|---|---|---|---|---|
| Example 5 | — | — | — | — | — | — | — |
| Example 6 | — | — | — | — | — | — | — |
| Example 7 | — | — | — | — | — | — | — |

TABLE 1-3-continued

| | Outer surface resin layer Lowermost layer | | | | | |
|---|---|---|---|---|---|---|
| | Composition [mol %] | TiO$_2$ amount [Wt %] | Layer thickness [μm] | Inorganic particle | Inorganic particle average diameter [μm] | Inorganic particle addition amount wt % | Addition amount of polyethylene wax [wt %] |
| Example 8 | — | — | — | — | — | — | — |
| Example 9 | — | — | — | — | — | — | — |
| Example 10 | Ethylene terephthalate 96 Ethylene isophthalate 4 | 0 | 2.0 | Silica | 1.8 | 0.10 | 0.01 |
| Example 11 | Ethylene terephthalate 96 Ethylene isophthalate 4 | 0 | 2.0 | Silica | 2.0 | 0.10 | 0.10 |
| Example 12 | Ethylene terephthalate 96 Ethylene isophthalate 4 | 0 | 1.0 | Silica | 0.8 | 0.20 | — |
| Example 13 | Ethylene terephthalate 96 Ethylene isophthalate 4 | 0 | 5.0 | Silica | 2.0 | 0.10 | — |
| Example 14 | Ethylene terephthalate 96 Ethylene isophthalate 4 | 2 | 2.0 | Silica | 1.8 | 0.10 | — |
| Example 15 | Ethylene terephthalate 96 Ethylene isophthalate 4 | 2 | 2.0 | — | — | — | — |
| Example 16 | Ethylene terephthalate 96 Ethylene isophthalate 4 | 2 | 2.0 | — | — | — | — |
| Example 17 | Ethylene terephthalate 96 Ethylene isophthalate 4 | 2 | 5.0 | Silica | 1.8 | 0.20 | — |
| Comp. Example 1 | — | — | — | — | — | — | — |
| Comp. Example 2 | — | — | — | — | — | — | — |
| Comp. Example 3 | — | — | — | — | — | — | — |
| Comp. Example 4 | — | — | — | — | — | — | — |
| Comp. Example 5 | — | — | — | — | — | — | — |
| Comp. Example 6 | — | — | — | — | — | — | — |
| Comp. Example 7 | — | — | — | — | — | — | — |
| Comp. Example 8 | — | — | — | — | — | — | — |
| Comp. Example 9 | — | — | — | — | — | — | — |
| Comp. Example 10 | — | — | — | — | — | — | — |
| Example 18 | Ethylene terephthalate 96 Ethylene isophthalate 4 | 0 | 2.0 | — | — | — | — |
| Example 19 | Ethylene terephthalate 96 Ethylene isophthalate 4 | 0 | 5.0 | — | — | — | — |
| Example 20 | Ethylene terephthalate 96 Ethylene isophthalate 4 | 0 | 2.0 | — | — | — | — |
| Example 21 | Ethylene terephthalate 96 Ethylene isophthalate 4 | 0 | 2.0 | — | — | — | — |
| Example 22 | Ethylene terephthalate 96 Ethylene isophthalate 4 | 0 | 2.0 | — | — | — | — |

TABLE 1-4

| | Outer surface resin layer | | | | | | Lamination condition | |
|---|---|---|---|---|---|---|---|---|
| | TiO$_2$ in the total layer wt % | Total layer thickness [μm] | Melting point [° C.] | Crystallization Temperature [° C.] | Whiteness | Arithmetic average roughness [μm] | Water contact angle after heating [degrees] | Temperature of metal sheet [° C.] | Temperature of laminating roll [° C.] |
| Example 1 | 0 | 20 | 254 | 115 | — | 0.2 | 75 | 274 | 100 |
| Example 2 | 0 | 20 | 230 | 155 | — | 0.2 | 78 | 240 | 80 |
| Example 3 | 0 | 20 | 247 | 120 | — | 0.10 | 75 | 255 | 80 |
| Example 4 | 0 | 20 | 247 | 125 | — | 1.0 | 65 | 265 | 100 |
| Example 5 | 0 | 20 | 230 | 160 | — | 0.2 | 78 | 250 | 110 |
| Example 6 | 0 | 20 | 254 | 110 | — | 0.2 | 78 | 264 | 80 |
| Example 7 | 0 | 20 | 254 | 112 | — | 0.8 | 55 | 272 | 85 |
| Example 8 | 0 | 20 | 247 | 125 | — | 0.10 | 80 | 256 | 80 |

TABLE 1-4-continued

|  | Outer surface resin layer | | | | | | | Lamination condition | |
| --- | --- | --- | --- | --- | --- | --- | --- | --- | --- |
|  | TiO$_2$ in the total layer wt % | Total layer thickness [μm] | Melting point [° C.] | Crystal-lization Temperature [° C.] | Whiteness | Arithmetic average roughness [μm] | Water contact angle after heating [degrees] | Temperature of metal sheet [° C.] | Temperature of laminating roll [° C.] |
| Example 9 | 30 | 20 | 247 | 125 | 90 | 0.4 | 60 | 260 | 90 |
| Example 10 | 16 | 22 | 247 | 125 | 78 | 0.2 | 75 | 254 | 85 |
| Example 11 | 16 | 22 | 247 | 125 | 78 | 0.3 | 80 | 254 | 85 |
| Example 12 | 18 | 18 | 247 | 125 | 80 | 0.2 | 70 | 254 | 85 |
| Example 13 | 12 | 26 | 247 | 125 | 76 | 0.2 | 65 | 254 | 85 |
| Example 14 | 16 | 20 | 247 | 125 | 78 | 0.4 | 62 | 254 | 85 |
| Example 15 | 20 | 11 | 247 | 125 | 84 | 0.4 | 62 | 254 | 85 |
| Example 16 | 18 | 39 | 247 | 125 | 80 | 0.4 | 62 | 254 | 85 |
| Example 17 | 8 | 45 | 247 | 125 | 72 | 0.5 | 62 | 254 | 85 |
| Comp. Example 1 | 0 | 20 | 256 | 111 | — | 0.2 | 65 | 270 | 90 |
| Comp. Example 2 | 0 | 20 | 225 | 160 | — | 0.3 | 64 | 235 | 80 |
| Comp. Example 3 | 0 | 20 | 230 | 165 | — | 0.5 | 62 | 245 | 100 |
| Comp. Example 4 | 0 | 20 | 230 | 100 | — | 0.3 | 78 | 245 | 80 |
| Comp. Example 5 | 0 | 20 | 247 | 128 | — | 1.1 | 54 | 265 | 120 |
| Comp. Example 6 | 0 | 20 | 249 | 125 | — | 0.2 | 84 | 254 | 85 |
| Comp. Example 7 | 0 | 20 | 249 | 112 | — | 0.08 | 80 | 253 | 85 |
| Comp. Example 8 | 35 | 20 | 249 | 112 | — | 0.6 | 80 | 253 | 85 |
| Comp. Example 9 | 0 | 20 | 247 | 128 | — | 0.8 | 54 | 265 | 120 |
| Comp. Example 10 | 0 | 20 | 247 | 128 | — | 0.08 | 54 | 265 | 120 |
| Example 18 | 16 | 20 | 247 | 125 | 72 | 0.15 | 62 | 254 | 85 |
| Example 19 | 10 | 20 | 247 | 125 | 72 | 0.8 | 62 | 254 | 85 |
| Example 20 | 16 | 20 | 247 | 125 | 72 | 0.2 | 62 | 254 | 85 |
| Example 21 | 16 | 20 | 247 | 125 | 72 | 0.2 | 62 | 254 | 85 |
| Example 22 | 16 | 20 | 247 | 125 | 72 | 0.2 | 62 | 254 | 85 |

Assessment

The shaping property, the post-processing adhesion property, and the printing quality of the resin-coated metal sheet for a container of Examples 1 to 22 and Comparative Examples 1 to 10 were assessed by the methods described below. The assessment results thereof are summarized in Table 2 below. As can be seen in Table 2, in the resin-coated metal sheet for a container of Examples 1 to 22, the assessments of the shaping property, the post-processing adhesion property, and the printing quality were good; but in the resin-coated metal sheet for a container of Comparative Examples 1 to 10, assessment of any one of the shaping property, the post-processing adhesion property, and the printing quality was insufficient.

(1) Shaping property

After the resin-coated metal sheet for a container of each of Examples 1 to 22 and Comparative Examples 1 to 10 was applied with a paraffin wax, it was punched out to a circular sheet having a diameter of 123 mm, and then this was draw-shaped to a cup having an inner diameter of 71 mm φ and a height of 36 mm by means of a cupping press machine. Next, the cup thus formed was disposed in a DI shaping machine; and then, with the punch speed of 200 mm/s and the stroke of 560 mm, this was draw-processed again and ironing-processed in three stages with the total reduction rate of 51% (23%, 25%, and 25%, each) to finally shape to the can having an inner can diameter of 52 mm and a can height of 90 mm. Then, the breakage or the scrape-off on the surface of the resin coat layer after shaping was visually checked. The rating thereof was made in accordance with the following standards.

Rating ⊚⊚: There was no scrape-off observed at all.

Rating ⊚: Scrape-off was observed in the height position within 1 mm from the can flange portion.

Rating ○: Scrape-off was observed in the height position ranging from more than 1 mm to 5 mm from the can flange portion.

Rating Δ: Scrape-off was observed in the height position ranging from more than 5 mm to 20 mm from the can flange portion.

Rating ×: Scrape-off was observed in the height position till more than 20 mm from the can flange portion, or the trunk was broken.

(2) Post-processing adhesion property

The sample for the peel test (width 15 mm×length 120 mm) was cut out from the can trunk portion of the deep drawn can that was shaped in the assessment of the shaping property. The resin coat layer was partially peeled off from the long side edge of the cut-out sample, and then, the resin coat layer thus peeled-off was opened to the direction opposite to the metal sheet having the resin coat layer peeled off (angle: 180 degrees) to carry out the peel test with the pulling rate of 30 ram/min. The adhesion force per 15 mm width was assessed in accordance with the standards described below. The target surface of the adhesion force measurement was the side of the can's inner surface.

Rating ⊚: 1.47 N/15 mm or more (0.15 kgf/15 mm or more)

Rating ○: 0.98 N/15 mm or more and less than 1.47 N/15 mm (0.10 kgf/15 mm or more and less than 0.15 kgf/15 mm)

Rating ×: Less than 0.98 N/15 mm (less than 0.10 kgf/15 mm)

(3) Printing quality

The polyester-type printing ink (red color) was printed onto the resin coat layer of the resin-coated metal sheet for a container. After this was dried in a hot air drying oven at 200° C. for 2 minutes, this was cooled to a room temperature. Then, the cross-cut peel test of the printed surface was carried out to assess the adhesion property between the resin coat layer and the polyester-type printing ink. The rating was made in accordance with the peel-off amount.

Rating ⊚⊚: Peel-off amount of 0% or more and less than 3%

Rating ⊚: Peel-off amount of 3% or more and less than 10%

Rating ○: Peel-off amount of 10% or more and less than 20%

Rating △: Peel-off amount of 20% or more and less than 50%

Rating ×: Peel-off amount of 50% or more

TABLE 2

|  | Shaping property | Post-processing adhesion property | Printing quality |
| --- | --- | --- | --- |
| Example 1 | ⊚ | ⊚ | ⊚ |
| Example 2 | ⊚⊚ | ⊚ | ⊚ |
| Example 3 | ⊚ | ⊚ | ○ |
| Example 4 | ⊚ | ⊚ | ⊚⊚ |
| Example 5 | ⊚⊚ | ⊚ | ⊚ |
| Example 6 | ⊚ | ⊚ | ⊚ |
| Example 7 | ⊚ | ⊚ | ⊚⊚ |
| Example 8 | ⊚ | ⊚ | ○ |
| Example 9 | ⊚ | ⊚ | ⊚ |
| Example 10 | ⊚ | ⊚ | ⊚ |
| Example 11 | ⊚⊚ | ○ | ⊚ |
| Example 12 | ⊚ | ⊚ | ⊚ |
| Example 13 | ⊚ | ⊚ | ⊚ |
| Example 14 | ⊚ | ⊚ | ⊚⊚ |
| Example 15 | ⊚ | ⊚ | ⊚⊚ |
| Example 16 | ⊚ | ⊚ | ⊚⊚ |
| Example 17 | ⊚ | ⊚ | ⊚⊚ |
| Comp. Example 1 | △ | △ | ⊚ |
| Comp. Example 2 | × | Unmeasurable | ⊚ |
| Comp. Example 3 | △ | ⊚ | ⊚ |
| Comp. Example 4 | × | Unmeasurable | ○ |
| Comp. Example 5 | × | Unmeasurable | ⊚ |
| Comp. Example 6 | ⊚⊚ | ○ | × |
| Comp. Example 7 | △ | ○ | ⊚⊚ |
| Comp. Example 8 | × | × | ⊚⊚ |
| Comp. Example 9 | × | Unmeasurable | ⊚ |
| Comp. Example 10 | × | Unmeasurable | × |
| Example 18 | ⊚ | ⊚ | ○ |
| Example 19 | ○ | ⊚ | ⊚ |
| Example 20 | ⊚ | ⊚ | ⊚ |
| Example 21 | ⊚ | ⊚ | ⊚ |
| Example 22 | ⊚ | ⊚ | ⊚ |

INDUSTRIAL APPLICABILITY

According to the present invention, what can be provided is the resin-coated metal sheet for a container in which the resin coat layer on the outside of the can body is not broken or scraped off even when this is processed with a high degree of processing, and in addition, a printing quality thereof is superior.

REFERENCE SIGNS LIST

1 Resin-coated metal sheet for a container
2 Metal sheet
3 and 4 Resin coat layers
3a Outermost surface layer (upper layer)
3b Intermediate layer (main layer)
3c Lowermost layer (lower layer)

The invention claimed is:

1. A resin-coated metal sheet for a container, the metal sheet comprising:
a first resin coat layer provided on a first surface of the metal sheet, the first surface is configured to be an outside surface of the container after a shaping process;
a second resin coat layer provided on a second surface of the metal sheet, the second surface is configured to be an inside surface of the metal sheet, wherein
each of the first and the second resin coat layers is composed mainly of a polyester resin having a melting point that is in a range of from 230° C. to 254° C.,
the first resin coat layer is formed of a resin material having:
an arithmetic average roughness (Ra) that is in a range of from 0.10 μm to 1.0 μm in a state that the resin coat layers coat the metal sheet;
a crystallization temperature that is in a range of from 110° C. to 125° C. in the state that the resin coat layers coat the metal sheet; and
a water contact angle that is in a range of from 55 degrees to 80 degrees in a state that the resin coat layers have been heated at 240° C. for 90 seconds after the resin coat layers coat the metal sheet,
the first resin coat layer includes 0.010% by mass to 0.10% by mass of a polyethylene wax, and
a dropping point of the polyethylene wax is in a range of from 120° C. to 140° C.

2. The resin-coated metal sheet for a container according to claim 1, wherein of inorganic particles having an average particle diameter of 0.010 μm to 3.0 μm are present on a surface of the first resin coat layer at an amount that is in a range of from 100/mm² to 1500/mm².

3. The resin-coated metal sheet for a container according to claim 1, wherein the first resin coat layer includes 30% by mass or less of titanium oxide.

4. The resin-coated metal sheet for a container according to claim 2, wherein the first resin coat layer includes 30% by mass or less of titanium oxide.

5. The resin-coated metal sheet for a container according to claim 3, wherein the first resin coat layer has a three-layered structure including an outermost surface layer, an intermediate layer, and a lowermost layer, wherein
a film thickness of the outermost surface layer and a film thickness of the lowermost layer are in a range of from 1.0 μm to 5.0 μm,
a film thickness of the intermediate layer is in a range of from 6 μm to 30 μm,
the outermost surface layer and the lowermost layer include 0% by mass to 2% by mass of titanium oxide, and
the intermediate layer includes 10% by mass to 30% by mass of titanium oxide.

6. The resin-coated metal sheet for a container according to claim 4, wherein the first resin coat layer has a three-layered structure including an outermost surface layer, an intermediate layer, and a lowermost layer, wherein a film thickness of the outermost surface layer and a film thickness of the lowermost layer are in a range of from 1.0 μm to 5.0 μm, a film thickness of the intermediate layer is in a range of from 6 μm to 30 μm, the outermost surface layer and the lowermost layer include 0% by mass to 2% by mass of titanium oxide, and the intermediate layer includes 10% by mass to 30% by mass of titanium oxide.

7. The resin-coated metal sheet for a container according to claim 1, wherein the crystallization temperature is in a range of from 110° C. to 120° C.

8. The resin-coated metal sheet for a container according to claim 1, wherein the arithmetic average roughness (Ra) is in a range of from 0.10 μm to 0.15 μm.

9. The resin-coated metal sheet for a container according to claim 6, wherein the water contact angle is in a range of from 55 degrees to 75 degrees.

10. The resin-coated metal sheet for a container according to claim 1, wherein the dropping point of the polyethylene wax is in a range of from 130° C. to 140° C.

11. The resin-coated metal sheet for a container according to claim 1, wherein the resin material has ΔHc/ΔHm in a range of from 0.70 to 0.96 after coating the metal sheet, ΔHc is a heat of crystallization of the resin material, and ΔHm is a heat of melting of the resin material.

12. The resin-coated metal sheet for a container according to claim 5, wherein inorganic particles having an average particle diameter that is in a range of from 0.010 μm to 3.0 μm are present on a surface of the outermost surface layer, and an amount of the inorganic particles is in a range of from 0.02% to 0.40% relative to a mass of the first resin coat layer.

* * * * *